(12) United States Patent  
Bouchard et al.

(10) Patent No.: US 8,014,577 B2  
(45) Date of Patent: Sep. 6, 2011

(54) MICRO-ARRAY ANALYSIS SYSTEM AND METHOD THEREOF

(75) Inventors: Jean-Pierre Bouchard, Saint-Augustin-des-Desmaures (CA); Fabien Claveau, Québec (CA); Isabelle Noiseux, Québec (CA)

(73) Assignee: Institut National D'Optique, Sainte-Foy (CA)

( * ) Notice: Subject to any disclaimer, the term of this patent is extended or adjusted under 35 U.S.C. 154(b) by 1088 days.

(21) Appl. No.: 11/668,002

(22) Filed: Jan. 29, 2007

(65) Prior Publication Data

US 2008/0181482 A1 Jul. 31, 2008

(51) Int. Cl.  
*G06K 9/00* (2006.01)

(52) U.S. Cl. ........................................ 382/128

(58) Field of Classification Search ............... 382/100, 382/128, 129, 133, 134; 506/7, 9, 39; 435/6, 435/7.1, 7.2, 7.23; 356/337; 702/28  
See application file for complete search history.

(56) References Cited

U.S. PATENT DOCUMENTS

| | | | |
|---|---|---|---|
| 5,528,050 A * | 6/1996 | Miller et al. | |
| 6,297,018 B1 * | 10/2001 | French et al. | |
| 7,031,507 B2 | 4/2006 | Bacus et al. | |
| 2002/0150935 A1 * | 10/2002 | Zhou et al. | 435/6 |
| 2003/0153013 A1 | 8/2003 | Huang | |
| 2004/0018515 A1 * | 1/2004 | Diener et al. | 435/6 |
| 2005/0191620 A1 | 9/2005 | McDevitt et al. | |
| 2007/0071300 A1 * | 3/2007 | Ching | 382/129 |
| 2007/0099207 A1 * | 5/2007 | Fuchs et al. | 435/6 |
| 2007/0166771 A1 * | 7/2007 | Kapur et al. | 435/7.2 |
| 2010/0152054 A1 * | 6/2010 | Love et al. | 506/9 |

FOREIGN PATENT DOCUMENTS

| | | | |
|---|---|---|---|
| CA | 2485697 A1 | * | 12/2003 |
| EP | 1 586 897 | * | 10/2005 |
| WO | WO-2004/094977 | * | 11/2004 |

OTHER PUBLICATIONS

Shifeng, Li, Floriano, Pierre N., Christodoulides, Nicolaos, Fozdar, David Y., Shao, Dongbing, Ali, Menhaaz F., Dharshan, Priya, Mohanty, Sanghamitra, Neikirk, Dean, McDevitt, John T., Chen, Shaochen, *Disposable polydimethylsiloxane/silicon hybrid chips for protein detection*, Biosensors and Bioelectronics 21 (2005), pp. 574-580.

Floriano, Pierre N., Christodoulides, Nick, Romanovicz, Dwight, Bernard, Bruce, Simmons, Glennon W., Cavell, Myles, McDevitt, John T., *Membrane-based on-line optical analysis system for rapid detection of bacteria and spores*, Biosensors and Bioelectronics 20 (2005), pp. 2079-2088.

* cited by examiner

*Primary Examiner* — Samir A Ahmed  
*Assistant Examiner* — Atiba O Fitzpatrick  
(74) *Attorney, Agent, or Firm* — Norton Rose OR LLP

(57) ABSTRACT

There is described a system and a method for analyzing spots in a micro-array, the spots containing targeted specimen, the method comprising the steps of: providing a slide with a micro-array of the spots thereon; illuminating at least one of the spots; directing the light onto the at least one spot; collecting light emitted from the at least one spot; forming an image of the at least one spot using the collected light; and analyzing the image to distinguish at least one unit of the targeted specimen located within the at least one spot from any undesired material. The analysis results are aimed at the detection, classification and quantification of optically resolvable specimen such as micro-organisms or cells.

11 Claims, 5 Drawing Sheets

MICRO-ARRAY ANALYSIS SYSTEM AND METHOD THEREOF

BACKGROUND OF THE INVENTION

1. Field of the Invention

The present invention relates to solutions for detecting cellular material, and involves imaging techniques, image processing, optics, fluorescence and biochemistry.

2. Background Art

Micro-arrays are matrices of bio molecules spots deposited on a substrate that usually has the appearance of a microscope slide.

Micro-array technology was initially developed for genomics studies in order to realize massively parallel genetic assays for research applications such as human genome sequencing. DNA micro-array is a collection of microscopic DNA spots attached to a solid surface, such as glass, plastic or silicon chip forming an array for the purpose of expression profiling, monitoring expression levels for thousands of genes simultaneously. In one such application, molecules which are immobilized are single-stranded DNA molecules. A solution of probe molecules, which are fluorescently labeled single stranded DNA, is then made to interact with the micro-array. The probed DNA will then specifically bind to spots that are formed of complementary strands therefore revealing that those spots have a sequence that is similar to the probe. The arrays are then dried and read by a fluorescence detection system.

DNA micro-array fluorescent signals can be very weak which has led micro-array scanners to evolve into sophisticated and expensive confocal laser scanning systems for optimal sensibility, or cooled CCD camera systems for fast readout. These types of systems produce an image of the whole micro-array with a resolution of a few hundred pixels per spot. The imaging system's capability is used for compensating for variations in locations of the spots within the micro-array disposition, and for segmenting the spots from their surrounding background signal.

Recently, proteins have been immobilized on substrates to produce protein arrays. The deposited proteins can be antibodies targeted to specifically bind to viruses, toxins and micro-organism. The assay consists in letting a solution of unknown biological agent interact and specifically bind with the proteins on the array. If the unknown agents were previously fluorescently labeled, the micro-array can be analyzed right away, otherwise the array is revealed with a solution of fluorescently labeled antibodies that are also specific to the targeted biological agent. Antibodies or other types of capture molecules which are more similar in their nature, such as peptides or aptamers, can also be used to target agents.

Conventional micro-array scanners designed for DNA micro-arrays as detailed above, are still used for the analysis of protein based micro-arrays even though the requirements for these new applications are very different. The signal read by a conventional scanner is a measure of the total signal emanating from one spot, and can thus be affected by spurious contributions. Impurities, such as dusts and biological residues from the host solution, generally fluoresce and therefore contribute to the measured intensity of the spot's signal, in a way that is not related to the targeted agent. Furthermore, the efficiency of the fluorescence labeling of the revealing antibodies can vary greatly from experiment to experiment, leading to added variability which impairs the limit of detection.

SUMMARY OF INVENTION

It is therefore an aim of the present invention to provide a scanning system and method to overcome the above-mentioned drawbacks found with the prior art.

Therefore, in accordance with the present invention, there is provided a method for analyzing spots in a micro-array, the spots containing targeted specimen, the method comprising the steps of: providing a slide with a micro-array of the spots thereon; illuminating at least one of the spots; directing the light onto the at least one spot; collecting light emitted from the at least one spot; forming an image of the at least one spot using the collected light; and analyzing the image to distinguish at least one unit of the targeted specimen located within the at least one spot from any undesired material.

In accordance with another embodiment of the present invention, there is provided an apparatus for imaging at least one spot containing targeted specimen, the at least one spot located on a micro-array, the system comprising: a source of light; an optical apparatus associated to the light source to direct the light onto the at least one spot, and to collect light emitted from the at least one spot, the collected light forming an image of the at least one spot; a digital image acquisition device positioned with respect to the optical apparatus in a manner to permit the image acquisition, to acquire the formed image; and a processing unit operatively connected to the digital image acquisition device, to analyze the image in order to distinguish at least a unit of the targeted specimen located within the at least one spot from any undesired material.

In this specification, the term "fluorescing specimen" or "targeted specimen" is intended to refer to a targeted agent which is optically resolvable, such as for example a micro-organism or cells, and which has been made to fluoresce by direct labeling before interaction with the micro-array, or indirectly by labeled antibodies added once the targeted specimen are captured on the micro-array.

Further in this specification, the adjective "high resolution" is intended to refer to an imaging resolution that is sufficient to optically resolve each unit of targeted specimen or an agent targeted by the assay.

Again in this specification, the term "fluorescing element" is intended to refer to one fluorescing specimen or an agglomeration of fluorescing specimen seen on a captured spot image.

Still further in this specification, the term "blob" is intended to refer to a group of connected pixels found on the corresponding binary picture of a captured spot image. A group of pixels can define at least one unit of targeted specimen or a cluster of them.

BRIEF DESCRIPTION OF THE DRAWINGS

Having thus generally described the nature of the invention, reference will now be made to the accompanying drawings, showing by way of illustration a preferred embodiment thereof and in which.

It will be noted that throughout the appended drawings, like features are identified by like reference numerals.

DESCRIPTION OF THE PREFERRED EMBODIMENTS

The proposed micro-array scanning system can be used for example, to detect, classify and quantify units of fluorescing specimen. The spot location onto which the specimen binds provides for specificity and identification functionality. The processing of an image of a sufficiently high resolution, taken at a spot location on a micro-array, enables such identification and provides robustness to spurious signal sources such as dust, food residue and culture broth. For example, morphological features such as size and shape are used to discriminate targeted specimen from dust and other agents leading to detection errors. This is in contrast with known prior art, in which a measure of the total signal from one spot on a micro-array is taken.

As an example, in a protein micro-array aimed at the detection of cells such as micro-organisms or human cells, the fluorescence signal can be significantly higher than what is generated when reading common DNA micro-arrays. In addition, when the captured cells can be optically resolved with a proper optical system, the enumeration of individual units is made possible.

The micro-array analysis system herein described can also be used to account for any variation in the efficiency of fluorescence labeling by normalizing the acquired image.

Figure 1:
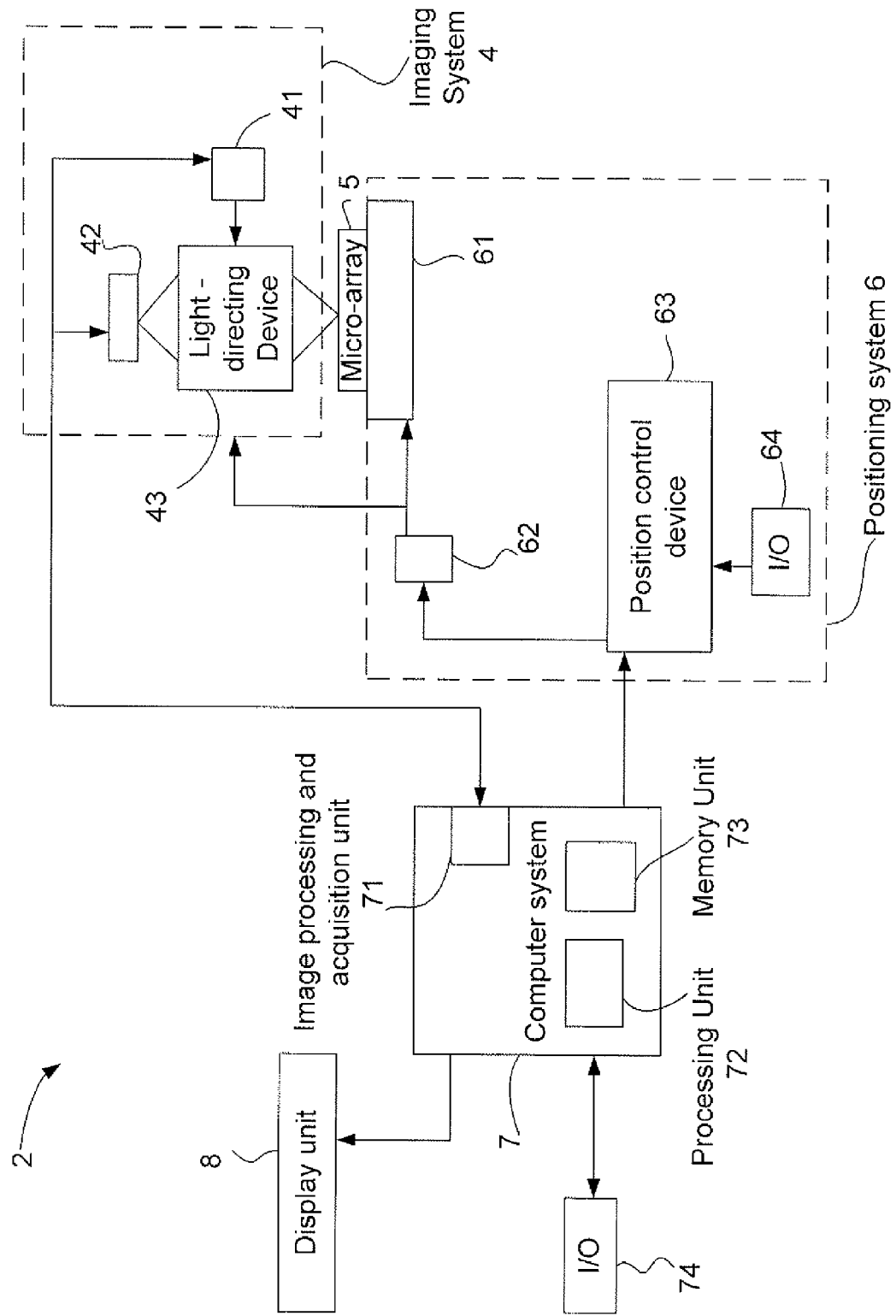
FIG. 1 is a schematic view of a micro-array analysis system in accordance with a first embodiment of the present invention.

Now referring to the drawings, FIG. 1 is a schematic view of a micro-array analysis system in accordance with a first embodiment of the present invention.

The analysis system 2 has an imaging system 4 for capturing an image of each spot location on a micro-array 5 being analyzed. The imaging system 4 allows the acquisition of an image having a resolution sufficiently high to distinguish the targeted specimen or agent.

The analysis system 2 also has a positioning system 6 for permitting the capture of images of all the spot locations on the micro-array 5 being scanned. A computer system 7 performs the image processing operations required by the analysis system 2, and the display unit 8 displays the analysis results to a user.

The imaging system 4 and the positioning system 6 are both controlled by the computer system 7.

Still referring to FIG. 1, the imaging system 4 has a light-emitting device 41, a camera 42, and a light-directing device 43.

Camera 42 may be any digital image acquisition device, such as a conventional digital camera. In addition, the light-directing device 43 is designed to permit camera 42 to capture an image having a sufficiently high resolution.

Again referring to FIG. 1, the positioning system 6 has a mobile stage 61, actuators and controllers 62, and a position control device 63.

The position control device 63 receives control signals from the computer system 7.

The actuators and controllers 62, controlled by the position control device 63, move the mobile stage 61 with respect to the imaging system 4, such that all the spots on the micro-array 5 can be scanned.

It is also considered possible to displace the imaging system 4 with respect to a fixed micro-array 5. Input and output ports 64 of the position control device 63 are optionally provided to override the automatic computer control of the positioning system 6. A user may thus directly control the positioning system 6 via joysticks, mouse or keyboards for example.

Some of the functions of the positioning system 6 can be achieved by the computer system 7 instead. For example, the position control device 63 could form part of the computer system 7, or its functions replaced by the operations of the computer system 7.

Still referring to FIG. 1, the computer system 7 has an image processing and acquisition unit 71, any other processing unit 72 and a memory unit 73.

Among many other function, computer system 7 controls the light-emitting device 41. In one embodiment, a signal created by the image processing and acquisition unit 71 can be used as a control signal. For example, a control signal sent to the light-emitting device 41 may act as to increase the intensity of the spot excitation light if lower levels of fluorescent light intensity are being emitted by the specimen in the spot.

Computer system 7 also controls the position system 6 such that any desired spots located on the micro-array are imaged. The computer can also automatically evaluate from the captured image if the spot location is correct. Thus, in the case of a misalignment, realignment can be done. For example, when a spot is not located exactly at the predicted place on the micro-array, a repositioning algorithm based on the misaligned spot image can correct the situation by enabling an appropriate realignment of the micro-array 5 with respect to the imaging system 4 until the spot image is acquired correctly.

All image processing steps are performed by the computer system 7, which sends the final images, analysis information and results to the display unit 8 for display to a user.

Particular functions are performed by each component of computer system 7. For example, the image processing and acquisition unit 71 receives images and processes them.

The processing unit 72 performs any other operations necessary for running computer software, implementing control operations, storing and retrieving data, etc. The processing unit 72 may also perform some of the image processing steps in conjunction with unit 71.

The memory unit 73 is for storing images captured and received by unit 71. The storage process and retrieving can be done according to particular spot locations corresponding to the captured spot images.

Finally, the computer system 7 may further have input and output peripherals 74 such as a keyboard, joysticks, mouse, speakers and the like.

Figure 2:
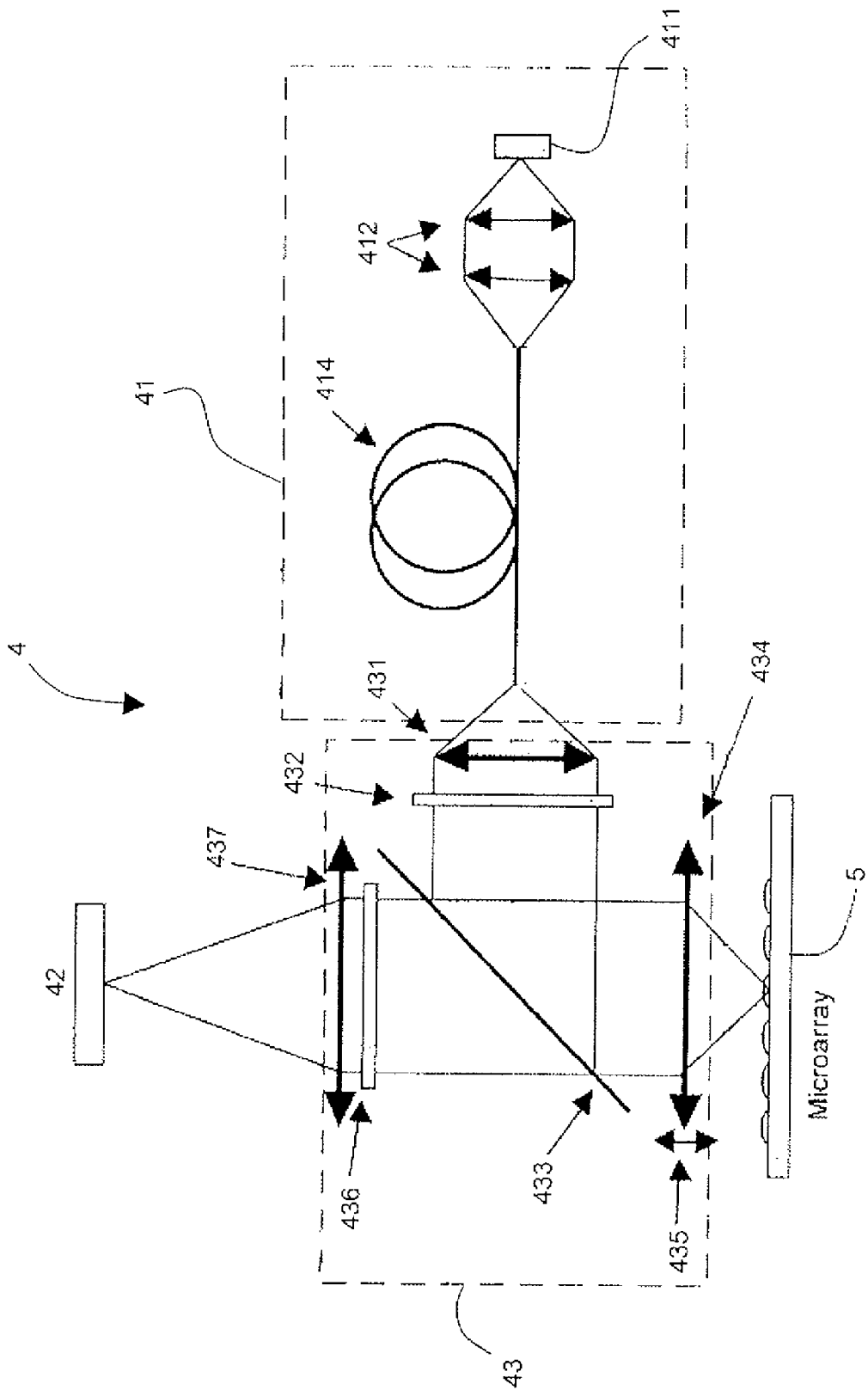
FIG. 2 is a schematic view of an imaging system of the micro-array analysis system of FIG. 1.

FIG. 2 is a schematic view of the imaging system 4 of the analysis system 2 of FIG. 1.

In one embodiment illustrated by FIG. 2, the light-emitting device 41 has a light source 411, a light transfer apparatus having collimating lenses 412, and an optical fiber 414.

Other embodiments are also possible. For example, the light-emitting device 41 can simply be a light source which is stable enough and emits an appropriate level of light intensity located within a range of wavelengths including at least the necessary excitation wavelengths. The excitation wavelengths depend on the dye or probe being used in a specific experiment or analysis. It is the light energy which is absorbed by the molecules under observation in order for them to emit fluorescent light.

In the particular embodiment illustrated in FIG. 2, the light source 411 may be any type of light source capable of emitting light at least at the excitation wavelengths. A light-emitting diode (LED) is an example. Other light-emitting semiconductor devices can also be used, such as laser diodes.

The light transfer apparatus is herein illustrated as having injection lenses 412 for directing the light being emitted from light source 411, into the piece of fiber 414. Any injection lenses or other apparatus for transferring the light of the image appropriately can be used.

The optical fiber 414 can be used to render the light being emitted by the light source 411 uniform. The optical fiber 414 can also ease the replacement of the light source 411. The optical fiber 414 can be any kind of fiber, having various transmission characteristics, dimensions and lengths. The use of multi-mode fiber is however well suited for the applications herein discussed.

Still referring to FIG. 2, the light-directing device 43 has a collimating lens 431, a first filter 432, a dichroic mirror or filter 433 (such as a beam-splitting device), another lens 434, a focusing mechanism 435, a second filter 436 and a last lens 437.

The collimating lens 431 is for collimating the light emerging from the light-emitting device 41 such that the light passes through filter 432 with minimum angular spread. The first excitation filter 432 ensures that the excitation light passing through has the necessary characteristics for the specimen to generate fluorescent light.

The dichroic mirror 433 directs the excitation light towards lens 434. A dichroic mirror or filter is known in the art for being able to selectively pass light within a determined range of wavelengths and reflect others within another range of wavelengths.

Lens 434 focuses the excitation light onto the spot of the micro-array 5 being scanned.

The light emitted from the spot then propagates back through lens 434, as in an upright epi-illumination scheme. Inverted designs are also possible.

Lens 434 forms an image of the spot an infinite distance away (the point of focus is said to be located at infinity since the emerging light rays are quasi-parallel).

The focusing mechanism 435 further ensures a proper focusing of the lens 434 by adjusting its location relative to the micro-array 5.

The emitted fluorescent light then passes through the dichroic mirror 433 before reaching the second emission filter 436.

The second filter 436, an emission or barrier filter, passes only light at wavelengths for which fluorescent light is being emitted. Various filters can be used and their specific characteristics depend on the dye or probe being used, along with the excitation light characteristics for a specific analysis.

The lens 437 then focuses the fluorescent light forming the image of the spot into the plane of the detector; in this case, into the eyepiece or sensor of camera 42.

In the above-described embodiment, the focal lengths of both lenses 431 and 434 are chosen appropriately, depending on the core diameter of the fiber 414 and the size of the spot being scanned. Different image ratios can thus be implemented. In one embodiment, an image ratio of 1:1 with respect to the core diameter of fiber 414 and the surface area of the spot being imaged can be obtained. In such a case, the surface area being illuminated has a size corresponding to the core diameter of fiber 414.

In addition, the dimensions of the camera's sensor further determine the ratio of the focal lengths of lenses 434 and 437. The desired resolution of the image being taken by camera 42 will further determine the choice of focal lengths for lenses 434 and 437. In one embodiment, if the camera 42 has a sensor with pixel dimensions 10 μm by 10 μm, the focal lengths of lenses 434 and 437 are chosen such that a spot having a surface area defined by a diameter of 300 μm forms an image having a surface area defined by a diameter of 3 mm once on the plane of the camera's sensor. The resulting captured image will thus have a resolution of about 1 μm/pixel.

Further in the above-described embodiment illustrated in FIG. 2, a skilled person in the art will understand that all the lenses described, lenses 412, 431, 434 with focusing mechanism 435, and lens 437, can be implemented using an assembly of lenses instead of a single lenses. Similarly, it is understood that the filters 432 and 436, as well as the dichroic mirror 433, can also be replaced by any other optical apparatus or assembly of optical items achieving the desired functionalities.

Figure 3:
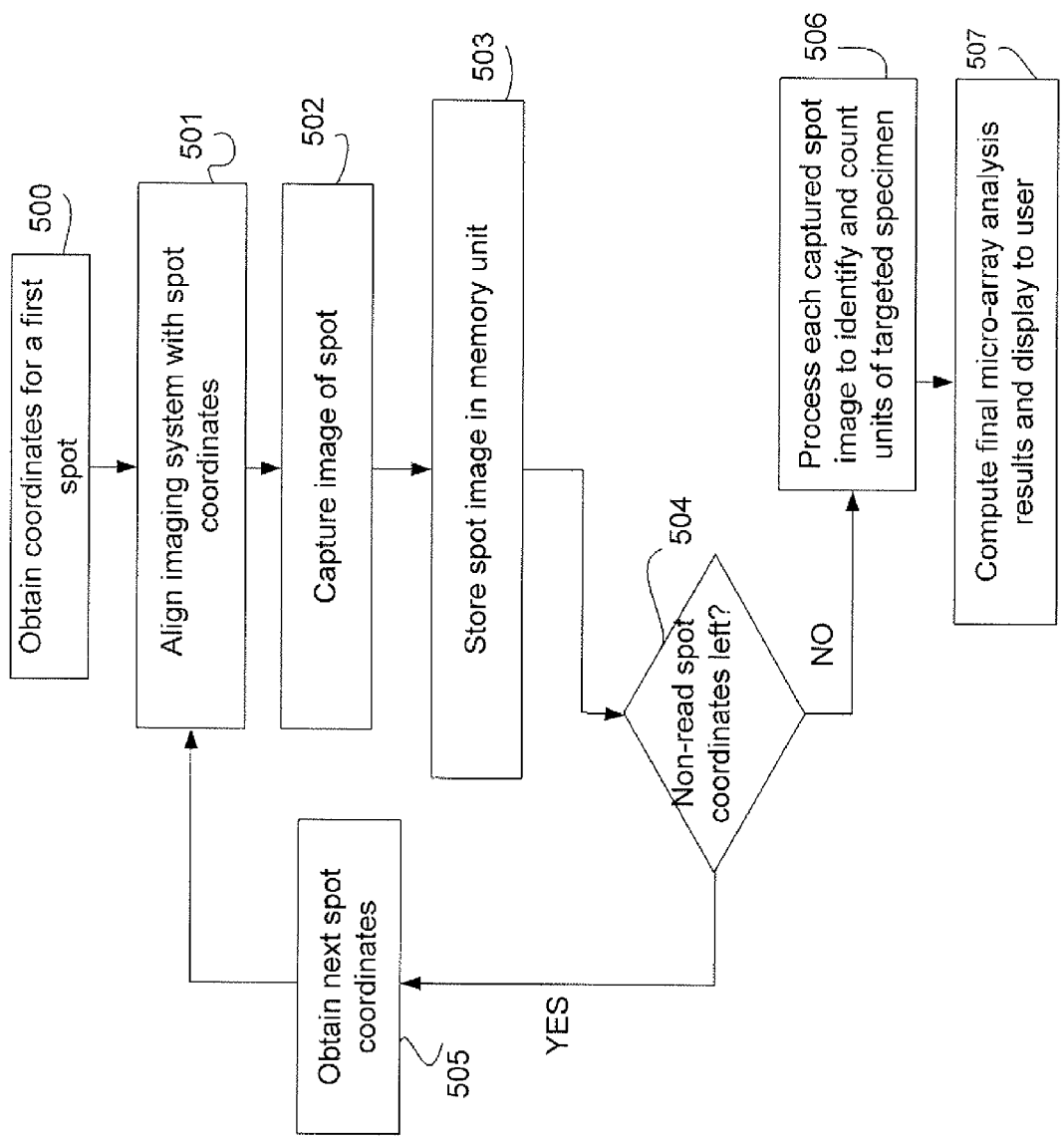
FIG. 3 is a block diagram illustrating a micro-array analysis method in accordance with a second embodiment of the present invention.

FIG. 3 is a block diagram illustrating a micro-array analysis method in accordance with a second embodiment.

The first step 500 consists in obtaining the coordinates of a first spot located on the micro-array 5. A referencing technique is used to relate spot coordinates given with respect to a specific micro-array being read, to spot coordinates given with respect to a given reference point in space, such that the position system 6 may align the spot being read with the imaging system 4.

In one embodiment a referencing system can be used, such that spot coordinates listed in a computer file stored in memory unit 73 of the computer system 7, are read one after the other until the end of the list. These spot coordinates could be column and row positions, for example, given with respect to a specific micro-array layout. The computer system 7 could further translate these coordinates into physical coordinates appropriate for controlling the positioning system 6 such that the imaging system 4 is properly aligned with the spot corresponding to the correct column and row positions on the micro-array 5. The physical coordinates could be defined by X and Y coordinates or control signals. These physical coordinates are given with respect to a fixed point in space and can depend on the moving mechanism used by the positioning system 6. Such spot coordinates can be stored in advance in a computer readable file defining the design of a specific micro-array layout.

In step 501, the computer system 7 sends appropriate control signals to the positioning system 6. The imaging system 4 is now aligned with the given spot location on the micro-array.

In step 502, the imaging system 4 captures an image of the given spot.

In step 503, the captured spot image is sent to the computer system 7 for storage. For example, a database located in memory unit 73 can be used to store the captured spot images according to the spot's coordinates. Other storage and file naming techniques can be used as well.

In steps 504 and 505, the analysis system 2 moves on to the next spot in the list of spots to be scanned and analyzed, unless all the spots have been read or do not require being read.

An alternative embodiment can permit a user to override the positioning system 6 through the use of input and output ports 64 of the positioning system 6, to directly align the imaging system 4 with a desired spot location.

In step 506, each captured and stored spot image is processed by the computer system 7, through the image processing and acquisition unit 71, such that the cellular material within each spot may be properly identified and quantified.

In step 507, the final micro-array analysis results are finally computed and displayed.

Step 506 can also be performed after step 503 and before step 504, since the analysis of a spot can be completed by the system as soon as the spot to be analyzed is captured. Once spot analysis results are available for the spot in process, the system moves to the next spot in the micro-array in steps 504 and 505.

Figure 4:
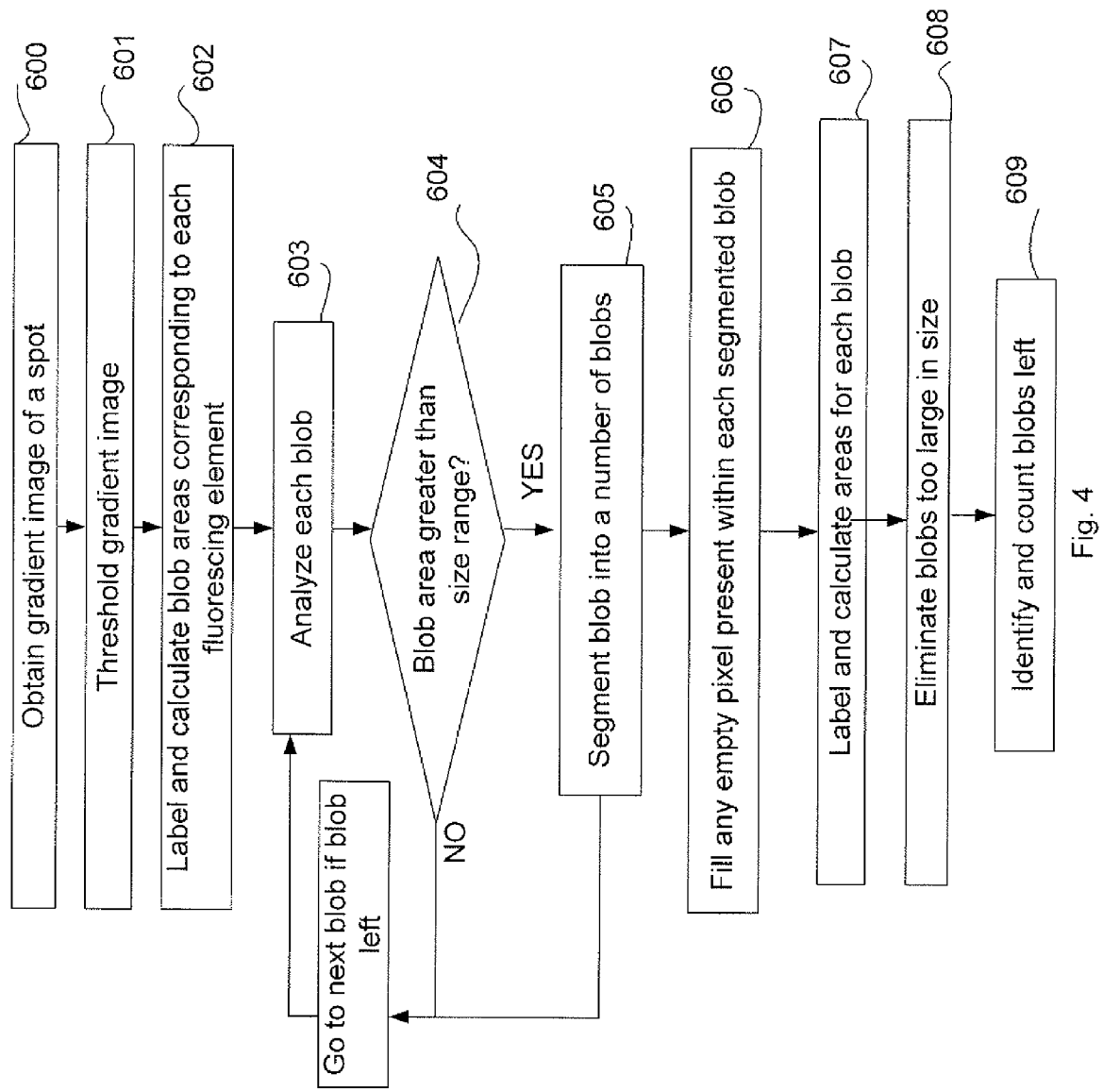
FIG. 4 is a block diagram illustrating an image processing method of the micro-array analysis method of FIG. 3.

FIG. 4 is a block diagram illustrating the image processing step 506 of the analysis method of FIG. 3.

The image processing step can be done in various ways, and such that each unit of cellular material, or each bacteria (herein referred to as units of targeted specimen), can be identified and counted once the image processing method is accomplished. More particularly, the image processing method is implemented such as to remove any undesired background effects, recognize shapes and sizes of fluorescing elements of interest, and segment any potential clusters into individual units of targeted specimen.

In step 600, a gradient calculation is performed from the acquired spot image, to obtain a gradient image and thus enable the detection of blobs possibly containing one or more units of targeted specimen. This step can be achieved by convolving the captured spot image with a discrete differentiation operator, such as the Sobel operator, to obtain a gradient image indicative of the captured spot image's intensity function.

In step 601, the above gradient image is thresholded to obtain a binary picture. A binary picture has only two levels of intensity. From this picture, one may distinguish blobs of varying shapes, sizes and areas, each formed by possibly one unit or an agglomeration of targeted specimen with other foreign and undesired material. Also, in one embodiment, the thresholding process can be performed by using a hysteresis technique.

In step 602, each blob found on the binary picture is labeled with its corresponding blob size or area.

In step 603, each blob in the binary picture is further analyzed.

In step 604, if the size of the blob being analyzed exceeds a threshold value set by a given size range of one unit of a targeted specimen, the method proceeds to step 605. If not, the method goes directly to step 606. This is done until all the blobs found on the thresholded gradient image are analyzed.

In step 605, the blob being analyzed may contain more than one unit of targeted specimen. An image segmentation algorithm is thus used to delimit each unit of targeted specimen on the captured spot image. In one embodiment, the segmentation algorithm may involve a bimodal thresholding of the histogram of the pixels forming the corresponding fluorescing element in the captured spot image. A bimodal thresholding technique supposes a preset minimal and a maximal size for each fluorescing element. Once boundary or threshold values are found using any segmentation technique, only the pixels of the blob which belong to the pale mode (or within the determined range or boundary limits) are kept. The resulting image thus shows segmented blobs, from which it is possible to distinguish units of targeted specimen and other units of fluorescing material.

In step 606, once all the blobs are analyzed through steps 603 to 605, any holes or empty pixels located within each unit of targeted specimen of the resulting fluorescing elements, or processed and segmented blobs, are filled to obtain a clearer spot image. This step further ensures that the proper area and size calculations are performed in the following steps.

In step 607, each unit of targeted specimen within the resulting fluorescing elements on the image processed is labeled with its corresponding area and size. In other words, the resulting blobs are labeled with their area and size.

In step 608, the blobs having areas exceeding a given maximum threshold value are discarded. These blobs are elements possibly formed by impurities or other undesired fluorescing agents and material.

In step 609, the final processed image now contains blobs corresponding to units of targeted specimen. The specimen are counted and identified accordingly. A concentration value may be obtained from this final count or total signal of the spot.

Figure 5B:
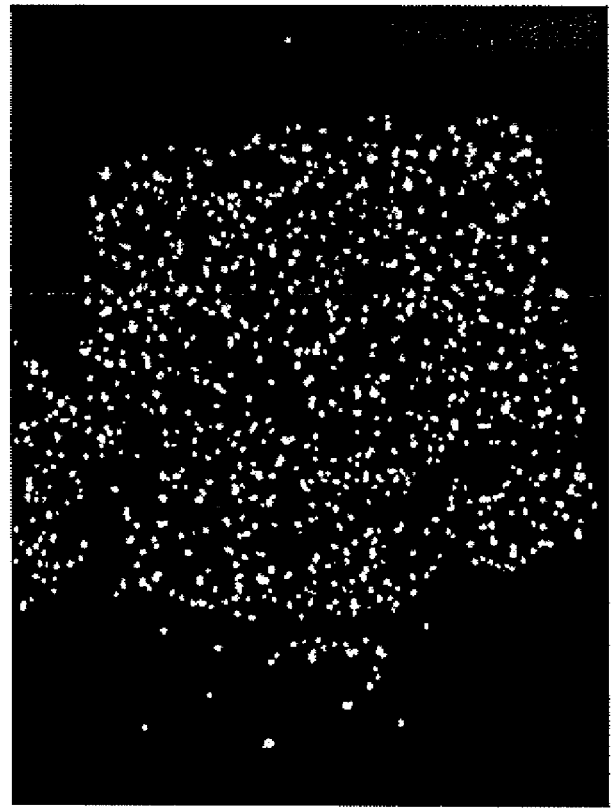
FIG. 5b is the image of FIG. 5a once processed using the processing method of FIG. 4.
Figure 5A:
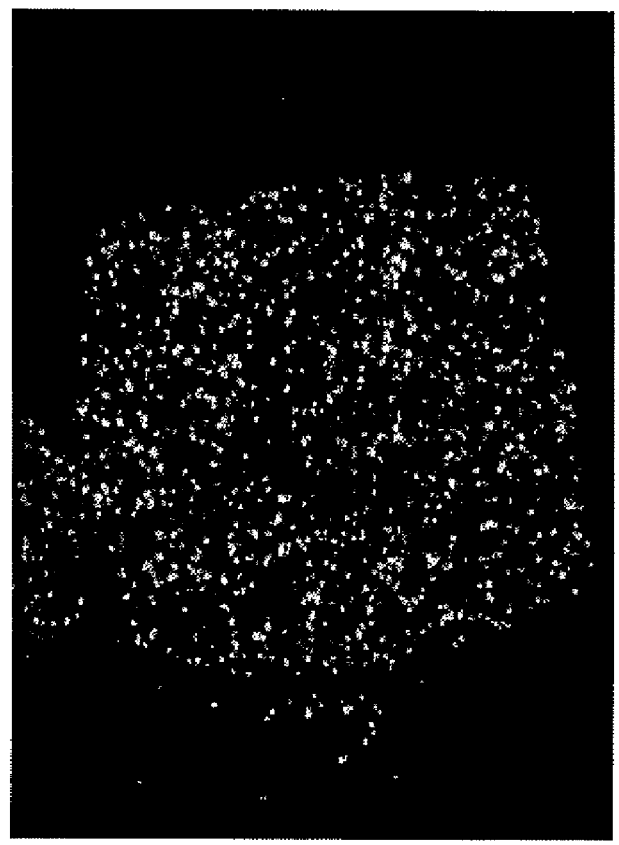
FIG. 5a is an image of a top plan view of a spot acquired with the imaging system of FIG. 1.

FIG. 5*a* is an image of a top plan view of a spot A acquired with the imagining system 4 of FIG. 2. This is an example of an unprocessed image of a spot A.

FIG. 5*b* is a final processed image of a spot A'. The targeted specimen on this processed spot image can be counted to obtain a total signal for this spot.

The image processing method described above permits the elimination of background fluorescence effects and any fluorescent light emanating from undesired artifacts which are optically differentiable from the targeted specimen. The variance in the efficiency of fluorescence marking is also alleviated by image processing method.

The image processing method implemented by the analysis system 2 herein described permits the quantification of various types of specimen. Other embodiments of the image processing method and analysis system 2 can be used to identify different specimen such as micro-organisms, like bacteria, or any other elements which are made to fluoresce in a way that they are distinguishable on the captured spot image. The detection of cells such as micro-organisms is of particular interest since micro-organisms generally have a size scale of a micron, which can be easily optically resolved. Other examples include the detection of different bacteria such as *Salmonella, Citrobacter freundii, Escherichia coli, Klebsiella pneumoniae* and *Serratia marcescens*. The micro-organisms can be set in a pure culture or mixed with other bacteria or food samples. Targeted specimen can be made to fluoresce directly by labeling before interaction with the micro-array, or indirectly by adding labeled antibody once the targeted specimen are captured in the micro-array. The micro-array analysis system 2 herein detailed is capable of reading fluorescence from any type of micro-array design. The number of spots can be limited in certain circumstances due to the speed with which the analysis system 2 is made to read each spot. Similarly, the surface area taken by the micro-array on the microscope slide can be limited depending on the mechanical restrictions of the chosen specifications of the positioning system 6. Various schemes may be implemented to permit the analysis of a larger number of spots per microscope slide, such as using both ends of one slide.

It is understood that several other embodiments of the micro-array scanning system and method may be implemented, and thus fall within the scope of the present invention.

What is claimed is:

1. A method for analyzing spots in a micro-array, said method comprising:

providing a slide with a micro-array of spots thereon of immobilized capture molecules, a plurality of individuals of at least one type of targeted specimen being specifically captured on said spots of said micro-array by the immobilized capture molecules, said target specimen labeled with fluorescent probes;

illuminating at least one of said spots to excite the fluorescent probes into emitting fluorescence signals;

collecting light of the fluorescence signals from an illuminated one of the spots;

forming an image of the illuminated one of the spots using said collected light;

distinguishing individuals of said at least one type of targeted specimen located within said illuminated one of the spots using the light of fluorescence signals from other agents not belonging to the at least one type of targeted specimen;

quantifying a total number of the individuals of the targeted specimen within said illuminated one of the spots by individually counting the number of individuals of the distinguished targeted specimen therein; and outputting the total number of the individuals of the targeted specimen for said illuminated one of the spots.

2. The method as in claim 1, further comprising a step of realigning other portions of said micro-array to analyze other ones of said spots on said micro-array.

3. The method as in claim 1, wherein the step of distinguishing comprises a step of segmenting clusters of said targeted specimen when said clusters are above a predetermined size.

4. The method as in claim 3, wherein the step of segmenting comprises a step of performing a hysteresis thresholding analysis.

5. The method as in claim 1, wherein the step of distinguishing further comprises a step of filling pixels of said image within at least one of said individuals of targeted specimen.

6. The method as in claim 1, wherein the step of distinguishing further comprises a step of calculating an area for at least one of the individuals of the targeted specimen.

7. The method as in claim 1, wherein at least one of the steps of illuminating and collecting light comprises using at least one of a dichroic device and lenses.

8. The method as in claim 1, wherein the step of forming said image comprises capturing said image with a digital image acquisition device.

9. The method as in claim 1, wherein distinguishing comprises distinguishing at least one individual of said targeted specimen located within said illuminated one of the spots from any undesired material.

10. The method as in claim 1, wherein providing a slide with immobilized said capture molecules comprises providing a slide with antibodies.

11. The method as in claim 1, wherein illuminating, collecting, forming, distinguishing, quantifying, and outputting is repeated for each said spot of the slide.

* * * * *